United States Patent
Byrla et al.

(10) Patent No.: US 6,929,294 B2
(45) Date of Patent: Aug. 16, 2005

(54) VEHICLE HAVING A LUMINOUS UNLOCKING HANDLE AND METHOD OF MAKING SAID HANDLE

(75) Inventors: Jan Byrla, Sindelfingen (DE); Marco Polic, Sindelfingen (DE); Eberhard Loeffler, Stuttgart (DE); Juergen Moczygemba, Lichtenstein (DE)

(73) Assignee: DaimlerChrysler AG, Stuttgart (DE)

( * ) Notice: Subject to any disclaimer, the term of this patent is extended or adjusted under 35 U.S.C. 154(b) by 100 days.

(21) Appl. No.: 09/973,953

(22) Filed: Oct. 11, 2001

(65) Prior Publication Data

US 2002/0047279 A1 Apr. 25, 2002

(30) Foreign Application Priority Data

Oct. 11, 2000 (DE) .......................................... 100 50 160

(51) Int. Cl.⁷ ............................................... E05B 1/00
(52) U.S. Cl. ............................. 292/336.3; 292/DIG. 65; 292/347; 292/348; 292/352
(58) Field of Search ...................... 292/DIG. 43, 336.3, 292/347, DIG. 2, 348, 352, DIG. 65; 16/430, 110.1, 407, 421

(56) References Cited

U.S. PATENT DOCUMENTS

| | | | | |
|---|---|---|---|---|
| 1,263,880 A | * | 4/1918 | Glossop | |
| 1,762,447 A | * | 6/1930 | Lowes | |
| 2,071,147 A | * | 2/1937 | Watson | 74/558 |
| 2,125,783 A | * | 8/1938 | Heeman | 292/347 |
| D112,807 S | * | 1/1939 | Cossin | |
| 3,543,329 A | * | 12/1970 | Gulette | 16/121 |
| 3,706,673 A | * | 12/1972 | Wainer | 252/501 |
| 3,767,459 A | * | 10/1973 | Kingsley | 117/100 B |
| 3,829,558 A | * | 8/1974 | Logan | 423/409 |
| 3,872,222 A | * | 3/1975 | Barnes | 423/561 |
| 4,080,812 A | | 3/1978 | Knott | |
| 4,318,001 A | * | 3/1982 | Degenhardt | 250/483 |
| 4,724,327 A | * | 2/1988 | Mitchell | 250/484.1 |
| 4,981,314 A | * | 1/1991 | Carr | 292/347 |
| 5,008,551 A | * | 4/1991 | Randolph | 250/462.1 |
| 5,088,781 A | * | 2/1992 | Ono et al. | 292/347 |
| 5,129,694 A | * | 7/1992 | Tanimoto | 292/347 |
| 5,276,075 A | * | 1/1994 | Santini | 524/40 |
| 5,469,758 A | * | 11/1995 | Howie | 74/553 |
| 5,509,174 A | * | 4/1996 | Worrell | 16/121 |
| 5,640,741 A | * | 6/1997 | Yano | 16/116 R |
| 6,018,292 A | * | 1/2000 | Penny | 340/426 |
| 6,086,131 A | * | 7/2000 | Bingle | 296/76 |

FOREIGN PATENT DOCUMENTS

| | | | |
|---|---|---|---|
| DE | 3000231 | 7/1981 | |
| DE | 4120677 | 1/1992 | |
| DE | 19927179 | 12/2000 | |
| EP | 1039077 A2 | 9/2000 | |
| GB | 2 264 436 | * 1/1993 | G06F/13/20 |
| WO | WO 99/31171 | * 6/1999 | C08K/3/00 |

OTHER PUBLICATIONS

Office Action dated Oct. 20, 2004, from German Patent Office, wirh English translation.
Office Action dated Jun. 23, 2004, from German Patent Office.

Primary Examiner—Gary Estremsky
(74) Attorney, Agent, or Firm—Crowell & Moring LLP

(57) ABSTRACT

A vehicle particularly a passenger car, has an unlocking handle arranged in the vehicle interior for the opening operation of a lock of a closing element, such as a door, a flap, a hood, a lid, or the like, this unlocking handle having a luminous construction. In order to improve the finding of the unlocking handle in the dark, the unlocking handle has a basic body coupled with the lock and a luminous body mounted thereon made of a luminous material.

16 Claims, 3 Drawing Sheets

U.S. PATENT DOCUMENTS

| | | | |
|---|---|---|---|
| 6,139,394 A * | 10/2000 | Maxim | 446/219 |
| 6,209,933 B1 * | 4/2001 | Ang et al. | 292/336.3 |
| 6,242,064 B1 * | 6/2001 | Howie | 428/35.7 |
| 6,349,450 B1 * | 2/2002 | Koops | 16/412 |
| 6,349,984 B1 * | 2/2002 | Marrazzo et al. | 292/336.3 |
| 6,369,395 B1 * | 4/2002 | Roessler | 250/462.1 |
| 6,394,511 B1 * | 5/2002 | Lam et al. | 292/336.3 |
| 6,527,313 B2 * | 3/2003 | Takahashi et al. | 292/336.3 |
| 6,555,215 B2 * | 4/2003 | Pitts | 428/315.5 |
| 6,692,659 B2 * | 2/2004 | Brown et al. | 252/301.36 |
| 6,716,368 B1 * | 4/2004 | Schottland et al. | 252/301.36 |

\* cited by examiner

VEHICLE HAVING A LUMINOUS UNLOCKING HANDLE AND METHOD OF MAKING SAID HANDLE

BACKGROUND AND SUMMARY OF THE INVENTION

This application claims the priority of German Patent Document No. 100 50 160.5, filed in Germany, Oct. 11, 2001, the disclosure of which is expressly incorporated by reference herein.

The invention relates to a vehicle, particularly a passenger car, having an unlocking handle arranged in the vehicle interior for the opening operation of a lock of a closing element, such as a door, a flap, a hood, a lid, or the like, this unlocking handle having a luminous construction.

From German Patent Application with the official File Number 199 27 179.8 of Jun. 15, 1999, such a vehicle is known, in which an unlocking handle is arranged in the trunk of the vehicle and is used for the opening operation of the lock of the trunk lid. The surface of the unlocking handle may be of a luminescent construction. In addition, illuminating devices may be provided which are connected to the on-board vehicle power supply. As a result of this construction, a person shut into trunk will be enabled to escape from the trunk because, by means of such an unlocking handle, the trunk lid can be opened from the interior, the luminous surface of the unlocking handle facilitating the finding and operating of the unlocking handle when the trunk lid is closed. As a result of lethal accidents in which children locked themselves in the trunk of a vehicle during play, a demand exists for solutions of this type.

From U.S. Pat. No. 4,080,812, a vehicle is known in whose trunk an unilluminated unlocking handle is arranged by means of which the lock of the trunk lid can be operated for the purpose of an opening.

From German Patent Application DE 30 00 231 A1, a vehicle is known for whose doors operating keys are provided in the vehicle interior whose operation results in an opening of the lock of the respective door. A pressure surface of these operating keys can be illuminated in order to improve the detectability of the operating keys in the dark.

German Patent Document DE 41 20 677 A1 shows a vehicle whose doors have door handles on the interior side facing the vehicle interior, which door handles are accommodated in handle recesses. For a better detectability of the door handles in the dark, these handle recesses are illuminated, the light source used for this purpose having a self-sufficient construction and thus being independent of the on-board vehicle power supply.

The use of illumination devices for illuminating the unlocking handle has the disadvantage that the functioning of the illumination devices must be ensured and this requires a permanent checking. Furthermore, the mounting of additional illumination devices on the unlocking handle or in its proximity requires relatively high expenditures. Although the use of an unlocking handle with a luminous surface is less expensive, it has the disadvantage that, on the one hand, a relatively long high-intensity illumination of this surface is required in order to develop a lasting luminous effect. On the other hand, the luminous effect of such a surface diminishes relatively rapidly, so that a person shut into the trunk has only a relatively brief time period for finding and operating the unlocking handle.

A problem addressed by the present invention is to provide an arrangement for a vehicle of the initially mentioned type which can be produced at relatively reasonable cost and improves the finding of the unlocking handle in the dark.

According to the invention, this problem is solved by providing a vehicle interior space with an unlocking handle having a basic body coupled with a lock and a luminous body mounted on the basic body and made of luminous material.

The invention is based on the general idea of constructing the unlocking handle of at least two bodies, specifically of a basic body and luminous body, which are optimized with respect to their function. In this manner, it is possible to produce the luminous body of a material which has a particularly intensive and lasting luminous effect, while, because of its other material characteristics, for example, its stability, it does not have to be suitable for a use as a handle. In the case of the invention, the actual handle function is taken over by the basic body which is coupled in a suitable manner, for example, by way of a Bowden cable, with the respective lock.

As a result of a suitable selection of the material for the luminous body, a relatively brief and relatively weak illumination of the unlocking handle according to the invention is sufficient in order to make the latter visible in the dark for a relatively long period. This increases the certainty of finding the unlocking handle in the dark. Because the unlocking handle according to the invention has a luminous construction, basically no additional illuminating devices are required so that, in a simple embodiment of the invention, the unlocking handle and thus the vehicle equipped therewith can be produced at relatively low cost.

According to a preferred embodiment, the luminous body can be fitted onto the basic body by means of a dovetail guide. Such a dovetail coupling permits a form-locking and relatively firm connection between the two bodies. This also results in a particularly simple assembly of the two components.

In a further development, the luminous body may be secured by means of a detent connection on the basic body. As a result of this measure, the luminous body can be fastened to the basic body and cannot be lost. For example, the detent connection will engage when the luminous body is fitted onto the basic body.

The luminous body preferably consists of a luminescent crystal mixture which is mixed with a transparent plastic material, such as polypropylene, or is embedded in such a plastic material. Such an embodiment can develop a particularly high-quality luminescent effect.

In a further development, illuminating devices can be provided which permit an active illumination of the luminous body, in which case a control of the vehicle switches on these illuminating devices together with an interior illumination and/or an instrument panel illumination (the so-called "night design"). In this manner, it is, for example, ensured in the case of an unlocking handle arranged in the trunk that, also when the environment is dark, the luminous body of the unlocking handle is illuminated as soon as the trunk lid is opened.

The unlocking handle is preferably arranged in the trunk of the vehicle, where it is used for unlocking the lock of the trunk lid.

A problem on which the invention is based is also solved by an unlocking handle which is used for the opening operation of a lock of closing element, such as a vehicle door, a vehicle flap, a vehicle hood or a vehicle lid, this unlocking handle being provided for the arrangement in a vehicle interior and being constructed in a luminous manner, in which case the unlocking handle has a basic body provided for the coupling with the lock and a luminous body made of a luminous material which is mounted thereon.

Additional important characteristics and advantages of the arrangement according to the invention are contained in the claims, in the drawings and in the pertaining description of the drawings.

It is understood that the above-mentioned characteristics and the characteristics to be explained in the following can be used not only in the respective indicated combination but also in other combinations or alone, without leaving the scope of the present invention. In particular, the use of the unlocking handle according to the invention should not be limited to the unlocking of a trunk lid.

Other objects, advantages and novel features of the present invention will become apparent from the following detailed description of the invention when considered in conjunction with the accompanying drawings.

DETAILED DESCRIPTION OF THE DRAWINGS

Figure 1:
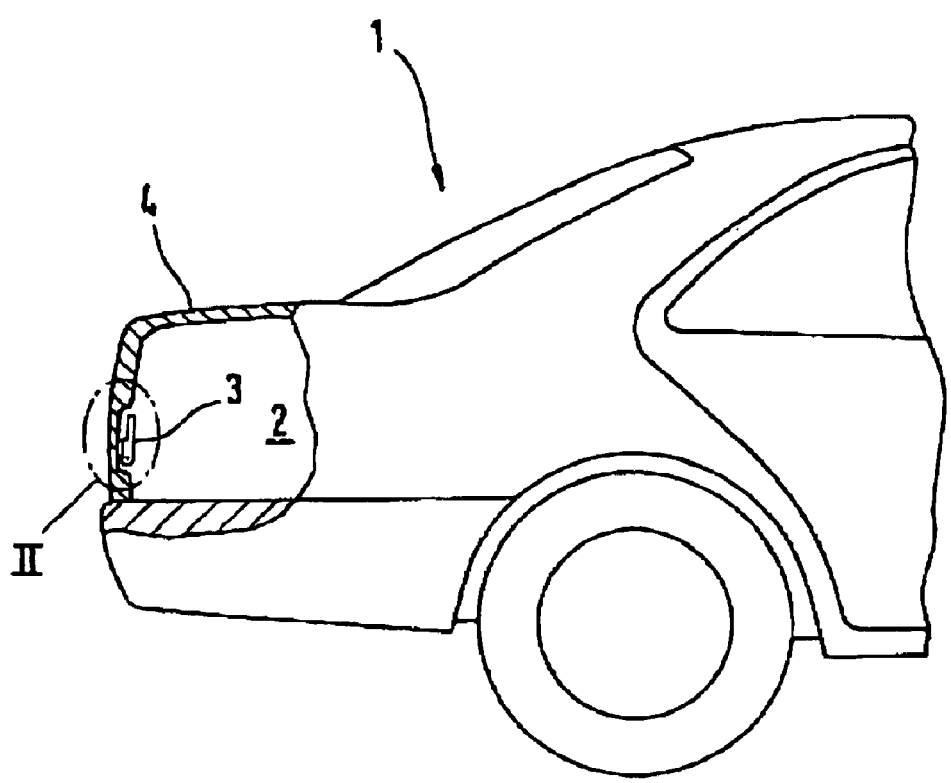
FIG. 1 is a partially sectional view of a rear area of a motor vehicle which is otherwise not shown depicting a representative location of a trunk unlocking handle, constructed according to preferred embodiments of the invention.

Referring to FIG. 1, a motor vehicle 1 according to the invention, which here is constructed as a passenger car, has an unlocking handle 3 in the vehicle interior, here in a trunk 2. By means of this unlocking handle 3, a door, a flap, a hood, a lid or another closing element of the vehicle 1 can be operated for the purpose of an opening. In the illustrated embodiment, the unlocking handle 3 is used for opening a rear lid 4 which is used for closing the trunk 2. It is clear that the unlocking handle 3 interacts in an appropriate manner with a pertaining lock of the respective door, lid, hood, which lock is not shown here.

As a result of the arrangement of the unlocking handle 3 in the trunk 2, a person who particularly is accidentally locked in the trunk 2 will be capable, by means of the unlocking handle 3, the operate the lock of the rear lid 4 for the purpose of an opening, whereby the person can free himself.

Figure 2:
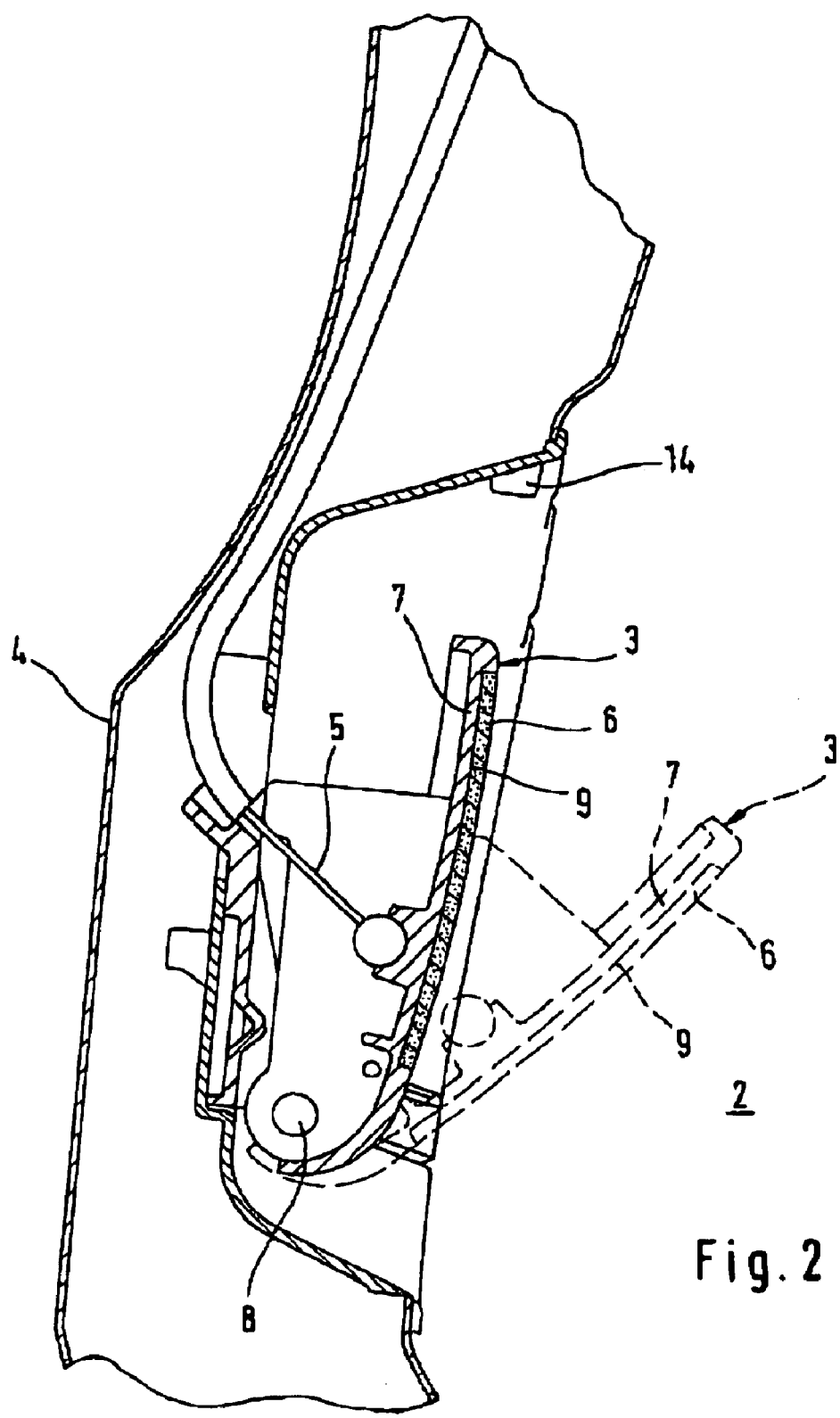
FIG. 2 is a view of a detail of a cutout characterized in FIG. 1 by II.

Corresponding to FIG. 2, the unlocking handle 3 can be coupled, for example, by way of a Bowden cable 5 with the rear lid lock which is not shown. In this case, the possibility of operating this lock by means of the unlocking handle 3 for opening it is provided additionally to a conventional operating device which may comprise, for example, an operating element arranged on the exterior side of the vehicle 1 and/or a radio-controlled operating system.

In FIG. 2, the unlocking handle 3 is indicated by drawn-out solid lines in its ready position, while its operated condition is indicated by broken lines during the opening of the respective closing element, here the rear lid 4.

In order to improve the detectability of the unlocking handle 3 in the dark, the unlocking handle 3 has a luminous construction. For this purpose, the unlocking handle 3 according to the invention has a luminous body 6 which consists of a luminous material. The luminous body 6 is constructed, for example, of a luminescent crystal mixture which is mixed with a corresponding transparent plastic material or is embedded in a plastic material in order to join the crystal mixture, which may be present in a powder form, to form a stable body, specifically the luminous body 6.

This luminous body 6 is mounted on a basic body 7 of the unlocking handle 3, this basic body 7 having the actual handle function and being correspondingly coupled with the respective lock. The basic body 7 consists of a suitable material, for example, of a fiber-reinforced, particularly carbon-fiber-reinforced and/or glass-fiber reinforced plastic material. The Bowden cable 5 is applied to the basic body 7. The basic body 7 is swivellable about a swivelling axis 8 disposed on the vehicle 1 or on the rear lid 4.

In the embodiment illustrated in FIG. 2, the top side of the unlocking handle 3, which is exposed to the trunk 2, has a recess 9 into which the luminous body 6 is inserted. In this manner, an integrated shape is achieved for the unlocking handle 3 assembled from the basic body 7 and the luminous body 6. In this case, the luminous body 6 may be glued into this recess 9.

In a preferred embodiment corresponding to FIG. 2, illuminating devices 14 may additionally be provided which permit an illumination of the luminous body 6. The vehicle 1 may, for example, have a suitable control which is not shown and which is coupled with the illuminating devices 14 as well as with an interior illumination, which is not shown, and/or with an instrument panel illumination which is not shown. The control can, for example, be adjusted such that a switching-on of the interior illumination and/or of the control panel illumination simultaneously causes an switching-on of the illuminating devices 14. In this manner, it is ensured that the luminous body 6 will also be illuminated when the environment of the vehicle 1 is dark. For example, the trunk illumination is normally constructed such that it is switched on when the rear lid 4 is opened. The illuminating devices 14 will then correspondingly also be active.

Figure 3:
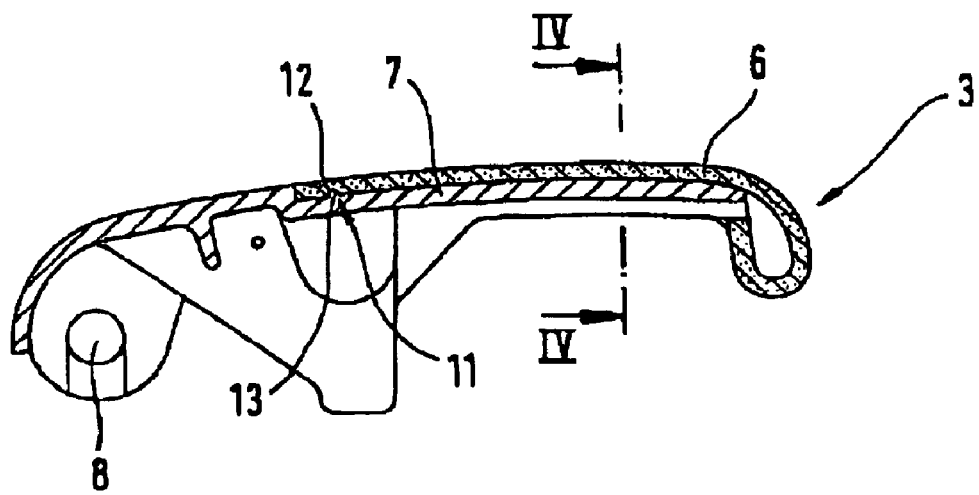
FIG. 3 is a longitudinal sectional view of an unlocking handle according to a preferred embodiment of the invention.
Figure 4:
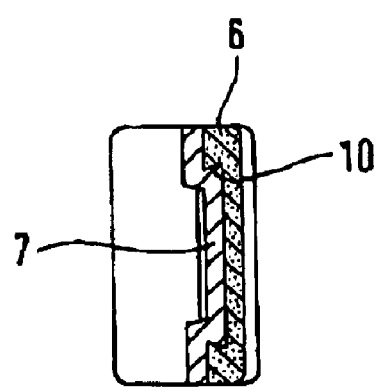
FIG. 4 is a sectional line of the unlocking handle taken along section lines IV—IV in FIG. 3.

Corresponding to FIGS. 3 and 4, in another embodiment, the luminous body 6 may be mounted on the basic body 7 by means of a dovetail guide 10, in which case the luminous body 6 can then be fitted onto the basic body 7. As a result, the mounting of the luminous body 6 on the basic body 7 will be simplified. According to FIG. 3, for securing the luminous body 6 on the basic body 7, a detent connection 11 may be provided in which at least one detent nose locks into a complementary detent opening as soon as the illuminating body 6 reaches the desired position when being fitted onto the basic body 7. In the present case, the basic body 7 is equipped with a detent nose 12, while a complementary detent opening 13 is constructed in the luminous body 6.

Since the unlocking handle 3 according to the invention is assembled of two components, which can be produced independently of one another, specifically of the luminous body 6 and of the basic body 7, the luminous body 6 as well as the basic body 7 can be optimized with respect to their respective function. The possibility of constructing the luminous body 6 of a material which has a particularly intensive and long-lasting luminous effect is especially significant in this case. The selection of the material for the luminous body 6 can basically be carried out without taking the stability values into account which are required for a handle function because this handle function is taken over by the basic body 7 which, in turn, consists of a correspondingly suitable material. As a result of this construction, it is therefore possible to improve the detectability of the unlocking handle 3 in the closed trunk 2, where safety is increased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A passenger car, having an unlocking handle arranged in a vehicle interior for opening operation of a lock of a closing element of a vehicle interior space, said unlocking handle having a luminous construction, wherein the unlocking handle has a basic body coupled with the lock and a luminous body which is mounted on the basic body by way of a dovetail guide, is made of a luminous material, and is secured in a desired position on the basic body by a detent connection.

2. A passenger car according to claim 1, wherein the luminous body consists of a luminescent crystal mixture which is mixed with a transparent plastic material and/or is embedded therein.

3. A passenger car according to claim 2, wherein illuminating devices are provided which permit an illumination of the luminous body, a control of the vehicle switching on these illuminating devices together with an interior illumination and/or a control panel illumination.

4. A passenger car according to claim 2, wherein the unlocking handle is arranged in the trunk of the vehicle and is used for unlocking a lock of a rear trunk lid.

5. A passenger car according to claim 1, wherein illuminating devices are provided which permit an illumination of the luminous body, a control of the vehicle switching on these illuminating devices together with an interior illumination and/or a control panel illumination.

6. A passenger car according to claim 5, wherein the unlocking handle is arranged in the trunk of the vehicle and is used for unlocking a lock of a rear trunk lid.

7. A passenger car according to claim 1, wherein the unlocking handle is arranged in the trunk of the vehicle and is used for unlocking a lock of a rear trunk lid.

8. A passenger car, having an unlocking handle arranged in a vehicle interior for opening operation of a lock of a closing element of a vehicle interior space, said unlocking handle having a luminous construction, wherein the unlocking handle has a basic body coupled with the lock and a luminous body which is mounted thereon and is made of a luminous material, wherein the luminous body is fitted onto the basic body by a dovetail guide, and wherein the luminous body is secured on the basic body by means of a detent connection.

9. A passenger car according to claim 8, wherein the luminous body consists of a luminescent crystal mixture which is mixed with a transparent plastic material and/or is embedded therein.

10. Unlocking handle for a vehicle arranged in a vehicle interior for opening operation of a lock of a closing element, comprising a basic body coupled with the lock, and a luminous body which is mounted on the basic body by way of a dovetail guide, is made of a luminous material, and is secured by a detent connection in a desired position on the basic body.

11. An unlocking handle operable in use to facilitate manual unlocking of a vehicle interior space cover, comprising:

a basic body formed of non-luminous material, which basic body in use is coupled with a lock for the cover, and a luminous body made of luminous material, mounted by way of a dovetail guide on the basic body, and secured by a detent connection in a desired position on the basic body.

12. An unlocking handle according to claim 11, wherein the luminous body consists of a luminescent crystal mixture which is mixed with a transparent plastic material and/or is embedded therein.

13. An unlocking handle operable in use to facilitate manual unlocking of a vehicle interior space cover, comprising:

a basic body formed of non-luminous material, which basic body in use is coupled with a lock for the cover, and a luminous body made of luminous material and mounted on the basic body, wherein the luminous body is fitted onto the basic body by a dovetail guide, and wherein the luminous body is secured on the basic body by means of a detent connection.

14. An unlocking handle according to claim 13, wherein the luminous body consists of a luminescent crystal mixture which is mixed with a transparent plastic material and/or is embedded therein.

15. A method of making an unlocking handle operable in use to facilitate a manual unlocking of a vehicle interior space cover, said method comprising:

forming a basic handle body of non-luminous material and having structural strength for facilitating transfer of manual forces moving said basic body to unlock the space cover, mounting a luminous body made of luminous material on the basic body by way of a dovetail guide, and connecting the luminous body made of luminous material to the basic body by way of a detent connection so as to secure the luminous body in a desired position on the basic body.

16. A passenger vehicle interior trunk lock handle made by the process of claim 15.

* * * * *